United States Patent
Hayashi et al.

(10) Patent No.: US 6,874,537 B2
(45) Date of Patent: Apr. 5, 2005

(54) MANIFOLD VALVE

(75) Inventors: Bunya Hayashi, Tsukuba-gun (JP); Makoto Ishikawa, Tsukuba-gun (JP); Masaru Narita, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 154 days.

(21) Appl. No.: 10/435,033

(22) Filed: May 12, 2003

(65) Prior Publication Data

US 2003/0226606 A1 Dec. 11, 2003

(30) Foreign Application Priority Data

Jun. 11, 2002 (JP) ........................................ 2002-169396

(51) Int. Cl.[7] ............................................... F16K 11/10
(52) U.S. Cl. ..................................... 137/884; 137/269
(58) Field of Search ................................. 137/269, 884

(56) References Cited

U.S. PATENT DOCUMENTS

| 3,111,139 A | * 11/1963 | Beckett et al. ............... 137/884 |
| 3,556,147 A | * 1/1971 | Sizer et al. ................... 137/884 |
| 3,951,167 A | * 4/1976 | Howell et al. ............... 137/884 |
| 4,815,496 A | 3/1989 | Nishitani et al. |
| 4,938,258 A | 7/1990 | Sato |
| 6,427,723 B2 | 8/2002 | Bogdanowicz et al. |
| 6,453,948 B2 | * 9/2002 | Notz et al. ................... 137/884 |
| 6,520,202 B2 | * 2/2003 | Miyazoe et al. ............. 137/554 |

FOREIGN PATENT DOCUMENTS

| DE | 100 13 192 A1 | 9/2001 |
| EP | 1 094 260 A2 | 4/2001 |

* cited by examiner

Primary Examiner—John Fox
(74) Attorney, Agent, or Firm—Oblon, Spivak, McClelland, Maier & Neustadt, P.C.

(57) ABSTRACT

A plurality of pipe joints is mounted to a lower face of a base portion of a manifold base. A plurality of solenoid valves are respectively mounted to two valve mounting faces of a valve mounting portion provided onto the base portion. Respective ports of the solenoid valves and the respective pipe joints communicate with each other through flow paths in the manifold base. A substrate assembly for feeding the respective solenoid valves is supported on a substrate mounting portion provided onto the valve mounting portion.

12 Claims, 8 Drawing Sheets

FIG. 3
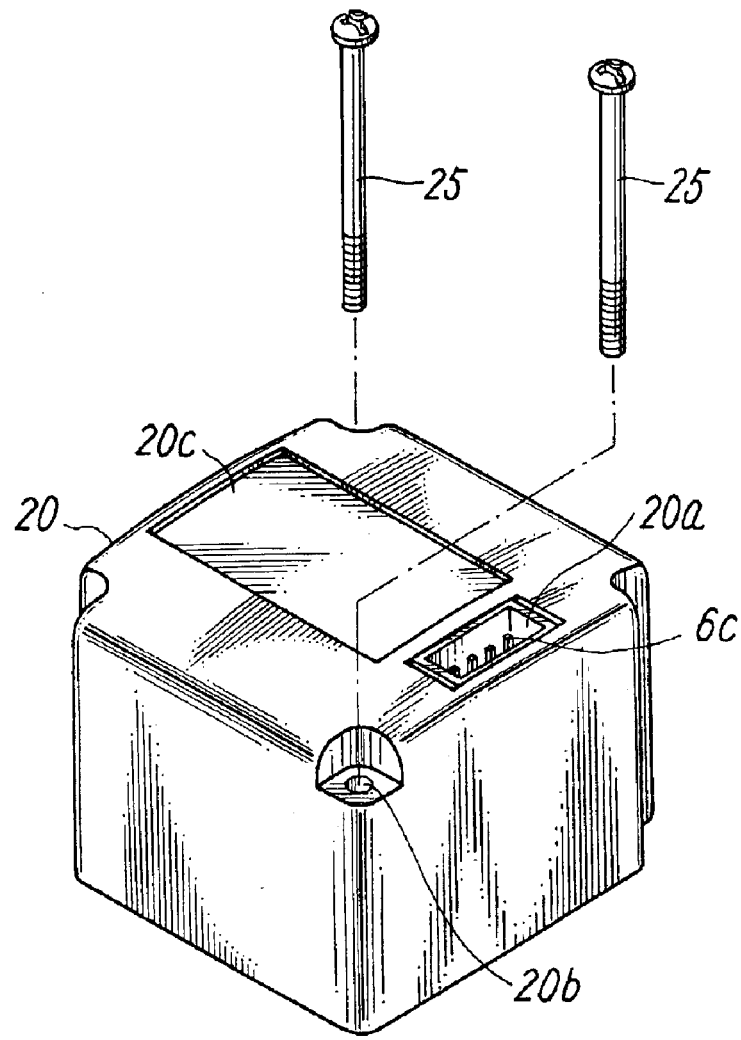
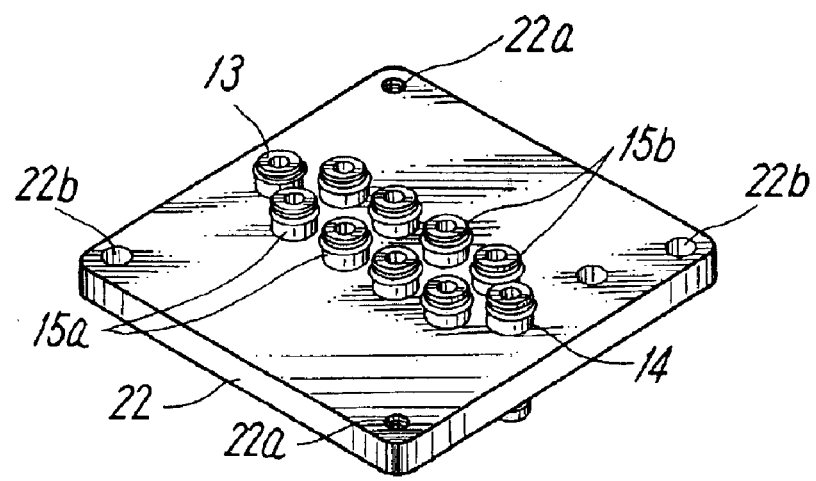

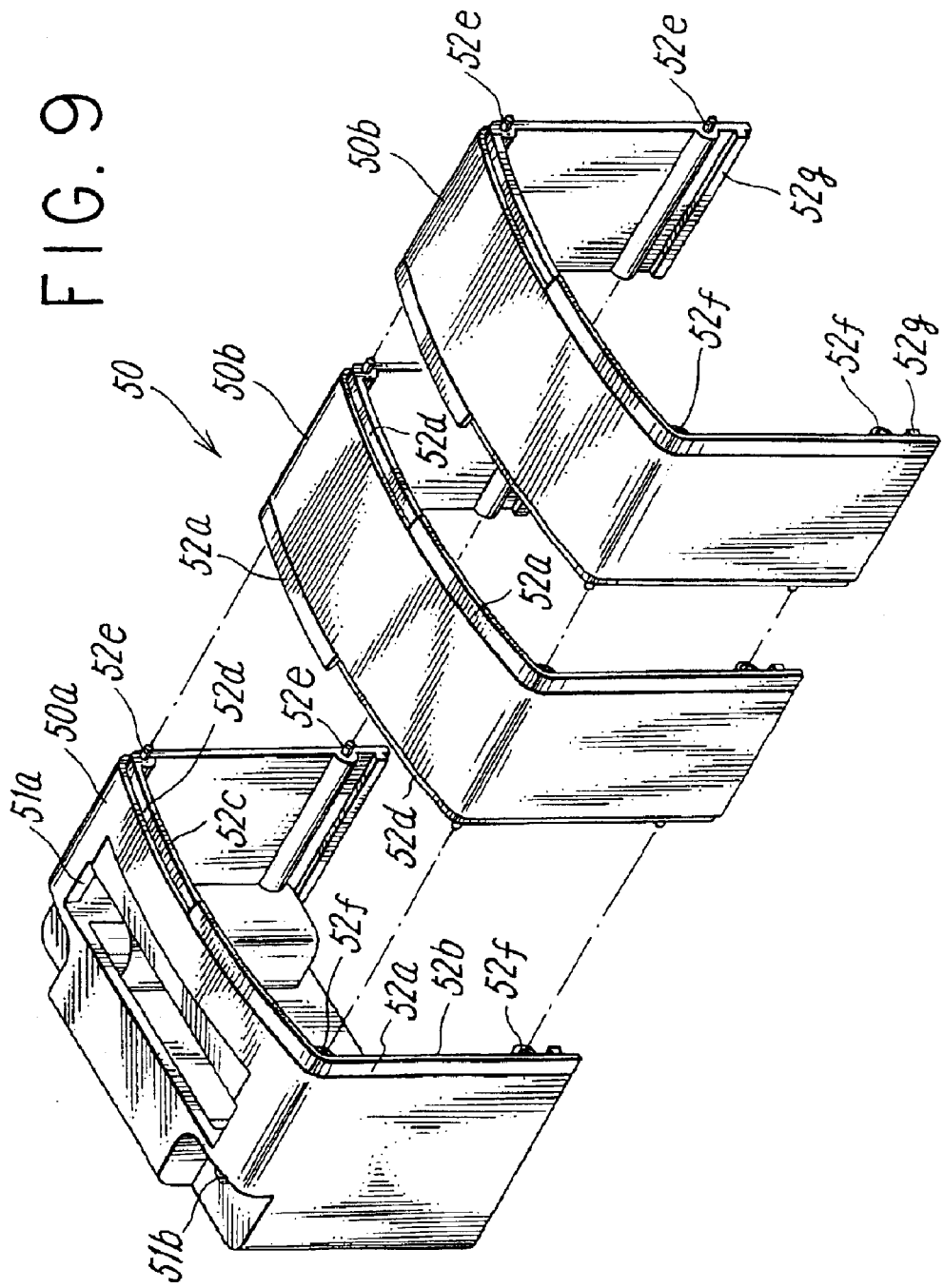

MANIFOLD VALVE

TECHNICAL FIELD TO WHICH THE INVENTION BELONGS

The present invention relates to a manifold valve in which a plurality of solenoid valves can be easily mounted to a manifold base and which is easy to connect to fluid pressure devices.

PRIOR ART

A manifold valve which is conventionally known in general is formed by placing a plurality of solenoid valves on a base-shaped manifold base, pressure fluid is supplied and discharged to and from the respective solenoid valves through the manifold base, and output pipes are directly connected to the manifold base or the solenoid valves.

However, in the above known manifold valve, the output pipes are usually and individually connected to respective fluid pressure devices and therefore, installation of the pipes is burdensome and also there is a possibility that the pipes are installed improperly through carelessness of a worker.

Moreover, because a plurality of solenoid valves are arranged in a row and disposed on the manifold base, at least a length of the manifold base equal to or greater than a dimension obtained by multiplying a width of the solenoid valve by the number of solenoid valves is necessary. Because the length of the manifold base increases as the number of the solenoid valves increases, the solenoid valves need to be divided among a plurality of manifold valves. Therefore, further miniaturization of the manifold valve is desired.

DISCLOSURE OF THE INVENTION

It is a technical object of the present invention to provide a manifold valve miniaturized by intensively mounting a plurality of solenoid valves to a manifold base at a high density by improving a structure of the manifold base.

It is another technical object of the invention to provide a manifold valve in which pipe installation is easy and there is no fear of improper pipe installation.

It is another technical object of the invention to provide a manifold valve in which a manifold base mounted with solenoid valves can be detached from pipes for the solenoid valves while leaving the pipes at the positions to thereby facilitate repair, replacement, and the like of the individual solenoid valves and the manifold base.

It is yet another technical object of the invention to provide a manifold valve to which a dustproof or waterproof small cover can be easily mounted.

To achieve the above objects, according to the invention, there is provided a manifold valve comprising: a manifold base including a base portion mounted at a lower face thereof with a plurality of pipe joints, a valve mounting portion provided on the base portion and having on opposite side faces of the valve mounting portion two valve mounting faces to which a plurality of solenoid valves are mounted, a substrate mounting portion which is provided on the valve mounting portion and on which a substrate assembly is placed, a plurality of fluid holes open at respective valve mounting positions of the valve mounting faces, and flow paths for connecting the fluid holes to the pipe joints; the substrate assembly formed by placing feeding connectors of the number corresponding to the number of the solenoid valves and one or more outside connecting connectors communicating with the feeding connectors on a substrate and placed on the substrate mounting portion; the plurality of solenoid valves each of which has a feeding terminal connected to the feeding connector of the substrate assembly and a plurality of ports communicating with the respective fluid holes on the valve mounting faces and which are arranged and mounted respectively on the two valve mounting faces on the manifold base; and a cover with which the solenoid valves and the substrate assembly are covered.

According to the manifold valve of the invention having the above structure, the two valve mounting faces are formed in the valve mounting portion of the manifold base and the plurality of solenoid valves are respectively mounted to these valve mounting faces. Therefore, the plurality of solenoid valves can be intensively mounted to the manifold base while being disposed at a higher density. As a result, miniaturization of the manifold valve is facilitated. Furthermore, the dustproof or waterproof small cover can be easily mounted.

Moreover, because the plurality of pipe joints communicating with the respective solenoid valves are disposed on the lower face of the base portion in the manifold base, these pipe joints can be disposed efficiently at such positions as not to hinder high-density disposition of the solenoid valves. As a result, installation of pipes between the manifold valve and fluid pressure devices is easy and there is no fear of improper pipe installation.

The substrate mounting portion is provided onto the valve mounting portion, the substrate assembly is placed on the substrate mounting portion, the feeding connectors are provided onto the substrate of the substrate assembly, feeding terminals of the solenoid valves are connected to the feeding connectors at the same time as mounting of the respective solenoid valves to the valve mounting faces. As a result, mounting of the solenoid valves is made remarkably easy.

According to the invention, the valve mounting portion has a narrower lateral width than the base portion and extends through a central portion of the base portion in a longitudinal direction, the two valve mounting faces are symmetric with each other, the respective solenoid valves are mounted to opposed positions of the opposite valve mounting faces with axes of the solenoid valves in vertical directions, and the substrate mounting portions of a pair are provided to positions on the valve mounting portion on outer sides of the valve mounting faces to support opposite end portions of the substrate of the substrate assembly.

In the invention, the outside connecting connector is provided at such a position on the substrate in the substrate assembly as to be supported by the substrate mounting portion from below and the cover is provided with a window hole through which the outside connecting connector is exposed.

Furthermore, in the invention, the plurality of pipe joints are retained by one joint plate and are mounted to the lower face of the base portion by joining the joint plate to the lower face of the base portion.

As a result, only the manifold base mounted with the solenoid valves can be detached while leaving the pipes for the solenoid valves at the positions to thereby facilitate repair, replacement, and the like of the individual solenoid valves and the manifold base.

According to the invention, the cover is divided into a plurality of cover pieces and is formed by successively joining these cover pieces. The cover may be translucent.

BRIEF DESCRIPTION OF THE DRAWINGS

FIG. 3 is an exploded perspective view of the first embodiment.

FIG. 9 is a perspective view of a portion of the cover in the second embodiment.

DETAILED DESCRIPTION

Figure 1:
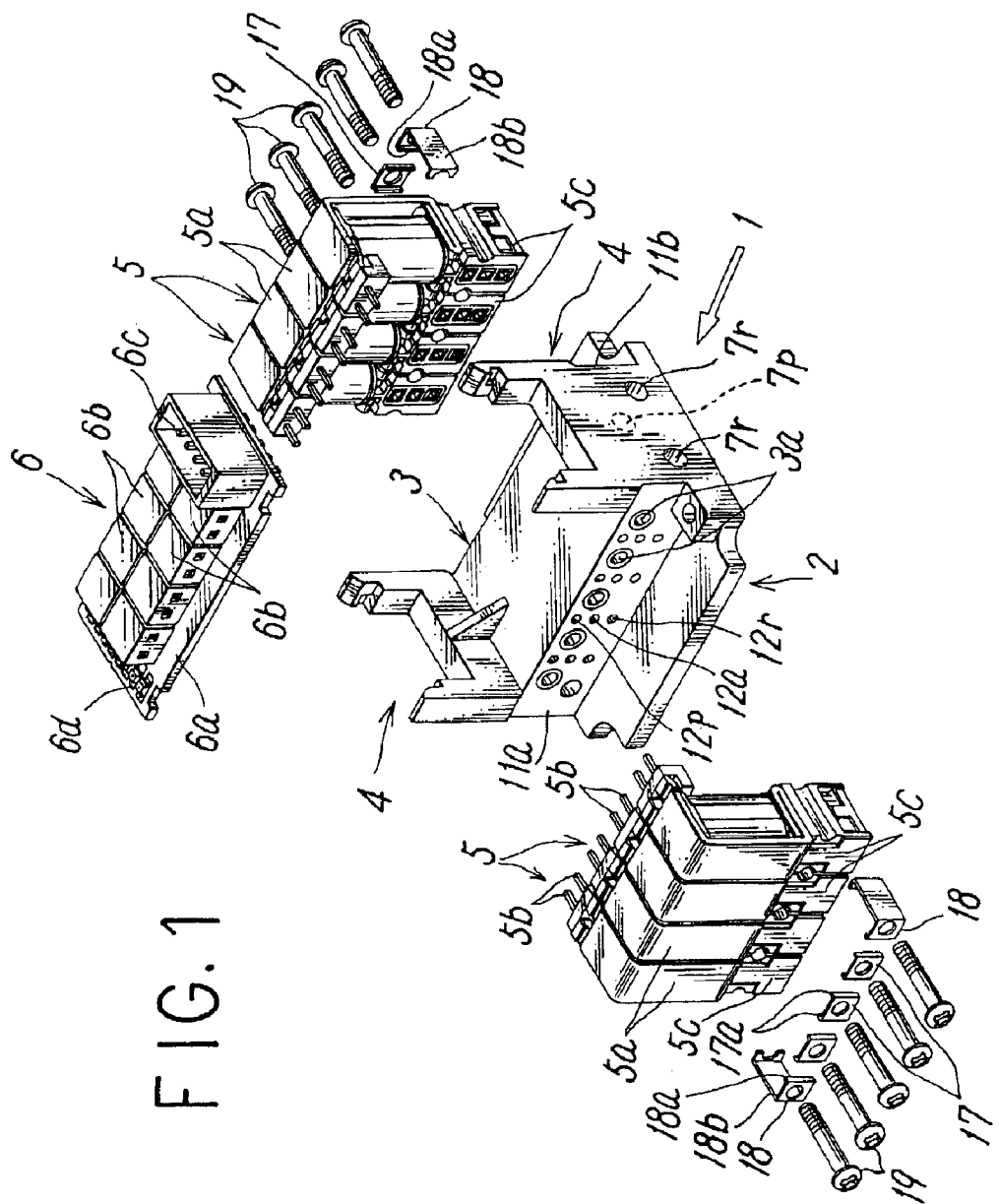
FIG. 1 is an exploded perspective view of an essential portion of a first embodiment of a manifold valve according to the present invention.

FIGS. 1 to 4 show a first embodiment of a manifold valve according to the present invention. The manifold valve is formed by mounting a plurality of solenoid valves 5 onto a manifold base 1. The manifold base 1 integrally includes a base portion 2 positioned at a lower end portion of the manifold base 1, a valve mounting portion 3 onto which the solenoid valves 5 are mounted, and a pair of substrate mounting portions 4 on which a substrate assembly 6 is placed.

The valve mounting portion 3 stands upward from the base portion 2, has a narrower lateral width than the base portion and a certain height, and extends through a central portion of the base portion 2 in a longitudinal direction. On opposite side faces of the mounting portion 3, two valve mounting faces 11a, 11b which are in reverse orientations to each other and symmetric to each other and to which the plurality of solenoid valves 5 are arranged and mounted are formed. At positions of the valve mounting faces 11a and 11b where the respective solenoid valves 5 are to be mounted, a plurality of fluid holes 12p, 12r, and 12a are respectively provided. These fluid holes respectively communicate with fluid flow paths 7p, 7r, and 7a provided inside the valve mounting portion 3, communicate with respective joint connecting holes 2a in a lower face of the base portion 2 through the fluid flow paths, and respectively communicate with pipe joints 13, 14, 15a, and 15b mounted to the respective joint connecting holes 2a. Pressure fluid is supplied to and discharged from the respective solenoid valves 5 through the pipe joints, flow paths, and fluid holes.

Figure 2:
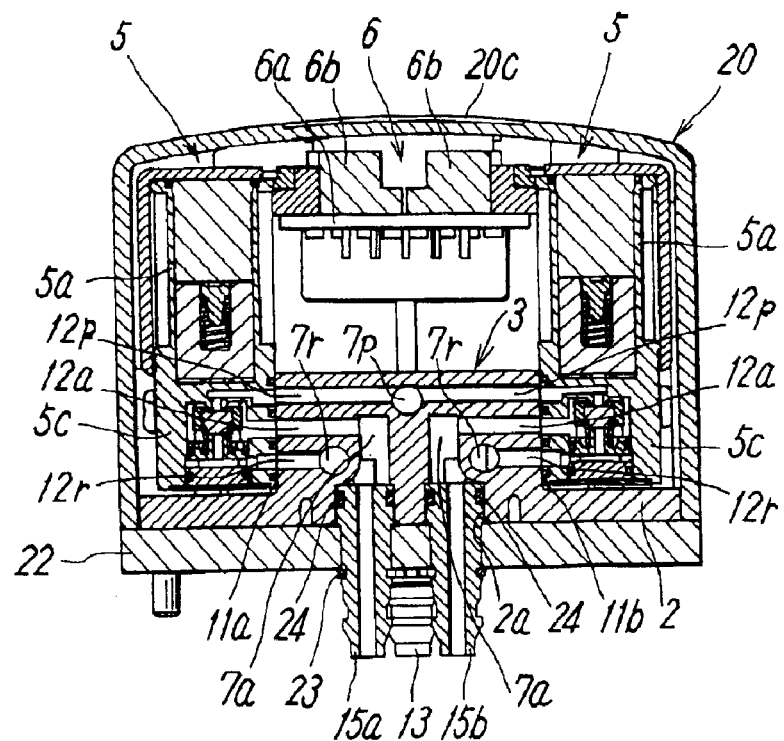
FIG. 2 is a sectional view of an assembled state of the first embodiment.
Figure 4:
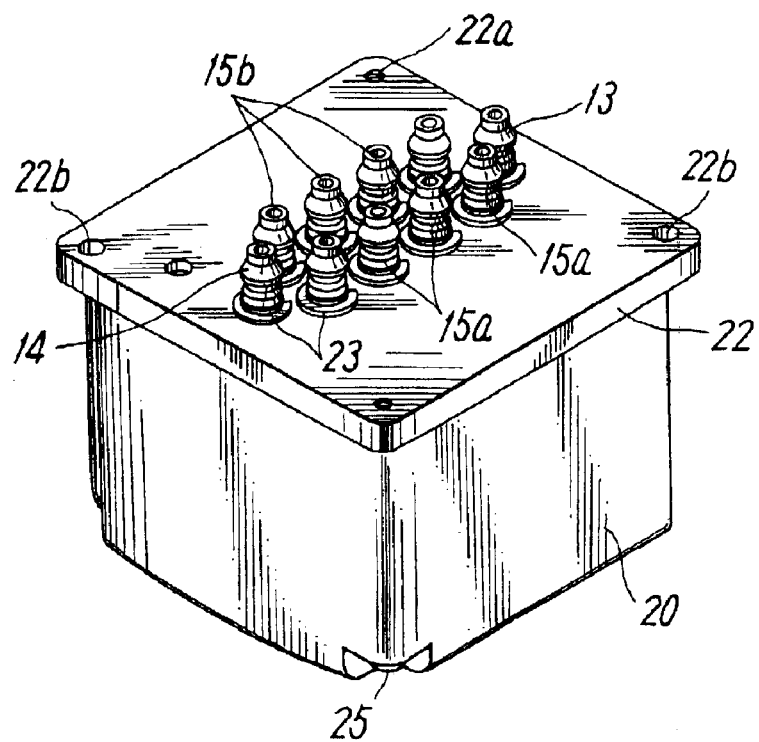
FIG. 4 is a perspective view of a structure of a lower face side of the first embodiment.

To put it more concretely, the fluid holes 12p and 12r provided to the mounting faces 11a and 11b are fluid holes for supplying and discharging pressure fluid to and from the respective solenoid valves 5. These fluid holes 12p and 12r respectively communicate with the supply flow paths 7p and the discharge flow paths 7r inside the valve mounting portion 3 and each of the fluid holes 12p and 12r communicates with one of the pipe joints 13 and 14 positioned on opposite ends out of a plurality of pipe joints in the lower face of the base portion 2 through these supply flow path and discharge flow path. Therefore, one of the two pipe joints 13 and 14 is for supply and the other is for discharge. The fluid holes 12a provided to the valve mounting faces 11a and 11b are fluid holes for output and are lead to the lower face of the base portion 2 through output flow paths 7a in the valve mounting portion 3 as shown in FIG. 2. Each of the fluid holes 12a communicates with one of the pipe joints 15a and 15b arranged and mounted at positions corresponding to the respective solenoid valves 5. Therefore, these pipe joints 15a and 15b are for output.

Each the solenoid valve 5 has the same structure as a normal solenoid valve and includes a solenoid driving portion 5a energized from feeding terminals 5b and a valve portion 5c controlled by the solenoid driving portion 5a to allow an output port to communicate with one of a supply port and a discharge port. The solenoid valves 5 are arranged and mounted with their axes in a vertical direction at positions of the opposite valve mounting faces 11a and 11b and facing each other with the respective ports communicating with the corresponding fluid holes 12p, 12r, and 12a on the valve mounting faces 11a and 11b.

The solenoid valve 5 is not limited to the above-described three-port valve but may be formed as a four-port or five-port valve. In this case, necessary fluid paths need to be provided to the valve mounting faces 11a and 11b and to communicate with the pipe joints provided to the lower face of the base portion 2.

The manifold base 1 has the substrate mounting portions 4 on the valve mounting portion 3 and the substrate assembly 6 for controlling tenderization of the respective solenoid valves 5 is placed on the substrate mounting portions 4. The substrate mounting portions 4 are formed to support four corners of the rectangular substrate assembly 6 but may be formed in other shapes.

The substrate assembly 6 is formed by mounting a plurality of feeding connectors 6b to be connected to the feeding terminals 5b of the respective solenoid valves 5, an outside connecting connector 6c electrically connected to the feeding connectors 6b through an electric circuit on a substrate 6a, and light-emitting devices 6d for emitting light to indicate operating states of the respective solenoid valves 5 onto the substrate 6a including the electric circuit and electronic components for controlling the respective solenoid valves 5. Two feeding connectors 6b are arranged in reverse orientations to each other and disposed at each position on the substrate corresponding to the solenoid valve 5. The outside connecting connector 6c is provided to one end side in a longitudinal direction on the substrate 6a. The light-emitting devices 6d are provided to the other end portion in the longitudinal direction on the substrate 6a.

When the respective solenoid valves 5 are mounted to the valve mounting faces 11a and 11b of the valve mounting portion 3 in the manifold base 1, the respective ports formed in the valve portion 5c of each the solenoid valve communicate with the respective fluid holes 12p, 12r, and 12a on the valve mounting faces 11a and 11b and the feeding terminals 5b of the solenoid driving portion 5a are inserted into terminal holes of the corresponding feeding connector 6b of the substrate assembly 6. Therefore, the respective feeding connectors 6b are disposed on the substrate 6a to correspond to the feeding terminals 5b of the respective solenoid valves 5.

If the plurality of solenoid valves 5 are arranged in two rows and mounted to the valve mounting faces 11a and 11b formed on opposite side faces of the valve mounting portion 3 and the feeding terminals 5b are connected to the feeding connectors 6b on the substrate 6a at the same time as described above, mounting of the solenoid valves 5 to the manifold base 1 is remarkably simplified and also a length of the solenoid valve mounting portion can be reduced substantially by half as compared with prior art in which the solenoid valves are arranged in a row and mounted onto the manifold base.

In the plurality of solenoid valves 5, the solenoid valves 5 adjacent to each other on the left and right sides are connected to each other by mounting hardware 17. In other words, locking hooks 17a on opposite ends of the mounting hardware 17 are locked to engaging portions provided to the valve portions 5c of the adjacent solenoid valves 5 and the mounting hardware 17 is fixed into screw holes 3a in the valve mounting portion 3 with mounting screws 19 in this state. In this case, because the mounting hardware 18 positioned at an outermost end does not have an adjacent solenoid valve, the locking hook 18a is provided to only one end of the mounting hardware 18 and a support wall 18b reaching the valve mounting face 11a or 11b is provided to the other end side.

The substrate assembly 6 is placed on the pair of substrate mounting portions 4, 4 positioned on opposite ends of the valve mounting portion 3 and opposite ends of the substrate 6a are supported on the substrate mounting portions 4, 4. In this case, the outside connecting connector 6c is preferably provided to an upper face of a portion of an end of the substrate 6a and supported by the substrate mounting portion 4. As a result, an acting force applied downward to the outside connecting connector 6c in connecting a connecting connector to the outside connecting connector 6c can be directly supported by the substrate mounting portion 4. The substrate 6a is preferably fixed to the substrate mounting portions 4 by engaging projections and recesses respectively provided to the substrate mounting portions 4 and the substrate 6a as shown in FIG. 1.

Thus, the plurality of solenoid valves are arranged in two rows and mounted to the valve mounting faces 11a and 11b provided to opposite side faces of the valve mounting portion 3, the substrate assembly 6 is disposed on the upper portion of the valve mounting portion 3, and the ports of the respective solenoid valves 5 communicate with the pipe joints in the lower face of the manifold base 1 through the flow paths provided inside the valve mounting portion 3. As a result, the large number of solenoid valves 5 can be mounted intensively on the manifold base 1 and the manifold valve can be made extremely compact and small.

The manifold base 1 is provided with a dustproof cover 20 with which the whole solenoid valves 5 and substrate assembly 6 are covered. The cover 20 is provided with a window hole 20a through which the outside connecting connector 6c is exposed, a mounting hole 20b, and a nameplate affixing recessed portion 20c. The whole or a part of the cover 20 is made of colorless or colored transparent material or translucent material with low transparency such that the light-emitting devices 6d and other portions which are inside the cover 20 and which need to be seen can be seen through the cover 20. By providing seals to portions (junction portions of members and the like) where the seals are required, the whole cover may be made waterproof.

To the lower face of the base portion 2 of the manifold base 1, the pipe joints 13, 14, 15a, and 15b are mounted by the following methods. The respective pipe joints 13, 14, 15a, and 15b are retained on a joint plate 22 and the joint plate 22 is joined to the lower face of the base portion 2 to thereby mount the respective pipe joints to the lower face of the base portion 2. Base end portions of the respective pipe joints 13, 14, 15a, and 15b are locked to an upper face of the joint plate 22 while being projecting from the upper face and tip end portions of the respective pipe joints project from a lower face of the plate 22 and are fixed with snap rings 23. On the other hand, the respective flow paths 7a, 7p, and 7r inside the valve mounting portion 3 are open in the respective joint connecting holes 2a in the lower face of the base portion 2. When the plate 22 is joined to the lower face of the base portion 2, the base end portions of the respective pipe joints 13, 14, 15a and 15b are connected by one operation into the joint connecting holes 2a in the base portion 2 through seals 24.

If the pipe joints are mounted to the manifold base 1 by using such a joint plate 22, it is possible to detach the manifold base 1 mounted with the solenoid valves while leaving the plate 22 together with the pipe joints at the disposed positions. In other words, while leaving pipes for the solenoid valves 5 as they are, only the manifold base 1 mounted with the solenoid valves can be attached and detached and it is possible to repair and replace individual solenoid valves, the substrate assembly, and the manifold base mounted with the solenoid valves.

However, it is also possible to individually and directly mount the respective pipe joints to the lower face of the base portion 2 in the manifold base 1.

Although the cover 20 and the joint plate 22 are fixed to the manifold base 1 by fixing the manifold base 1 and the cover 20 to each other with screws or the like in advance (not shown) and then screwing mounting screws 25 down into screw holes 22a in the joint plate 22 through the mounting holes 20b provided to corner portions of the cover 20, the fixing method is not necessarily limited to this. The mounting holes 22b in the plate 22 are mounting holes for fixing the manifold valve to the disposed position where the manifold valve needs to be disposed.

Next, by reference to FIGS. 5 to 10, a second embodiment of the manifold valve according to the invention will be described.

Figure 5:
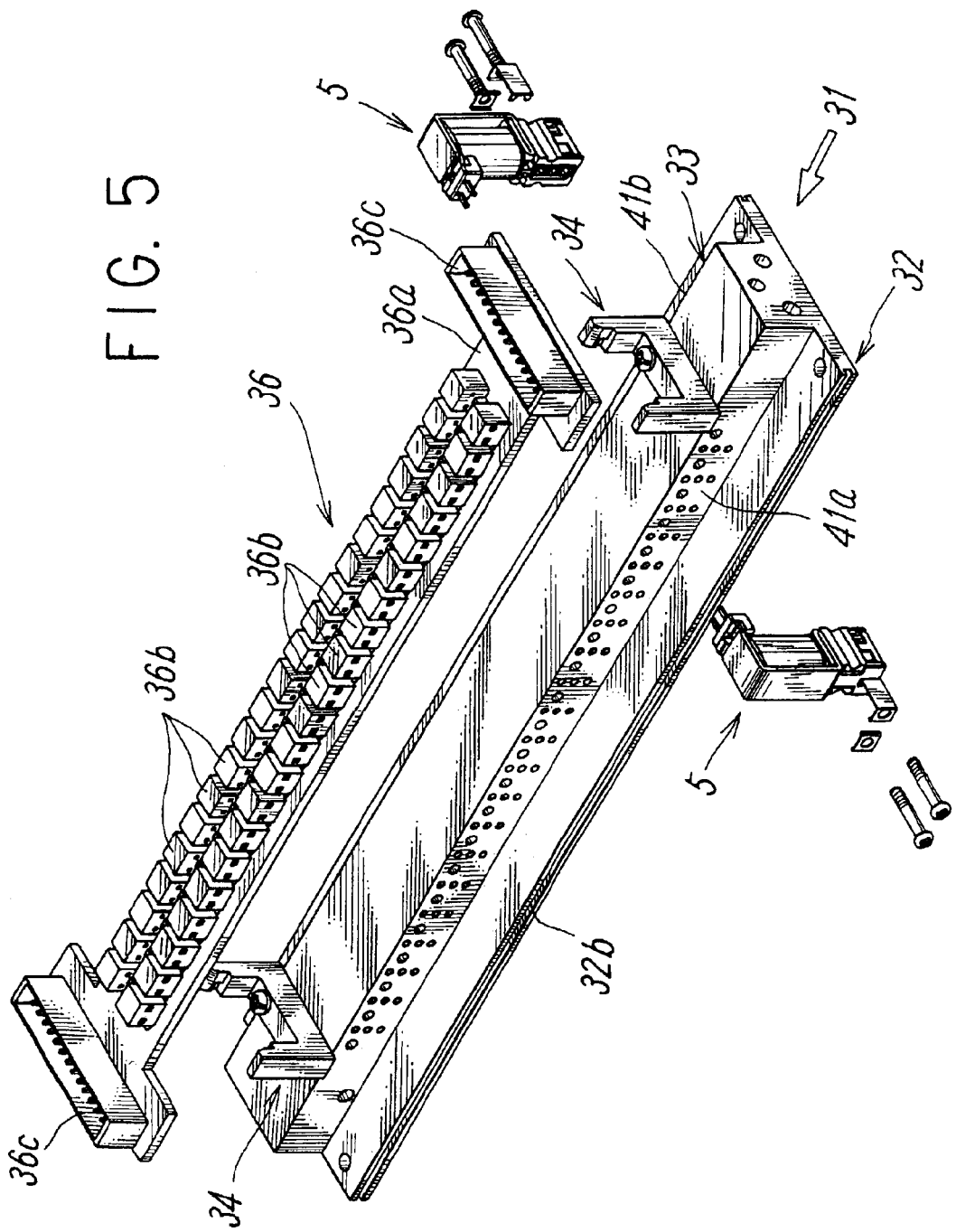
FIG. 5 is an exploded perspective view of an essential portion of a second embodiment of a manifold valve according to the invention.
Figure 6:
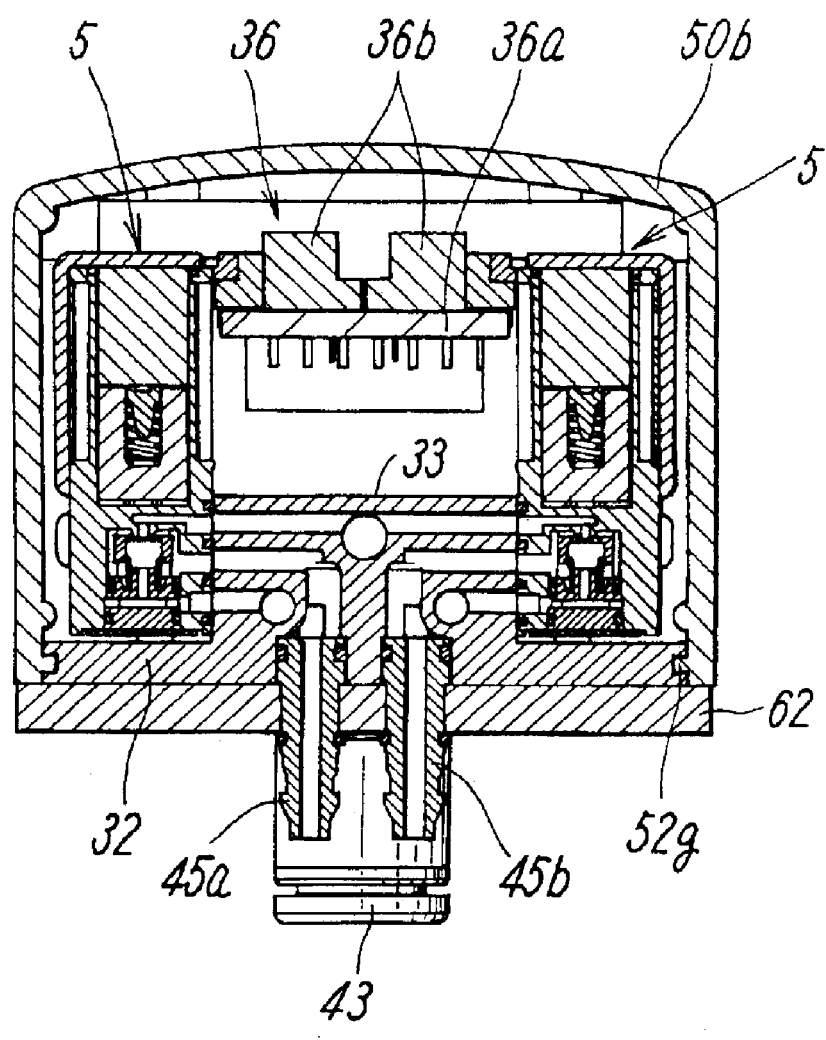
FIG. 6 is a sectional view of an assembled state of the second embodiment.
Figure 7:
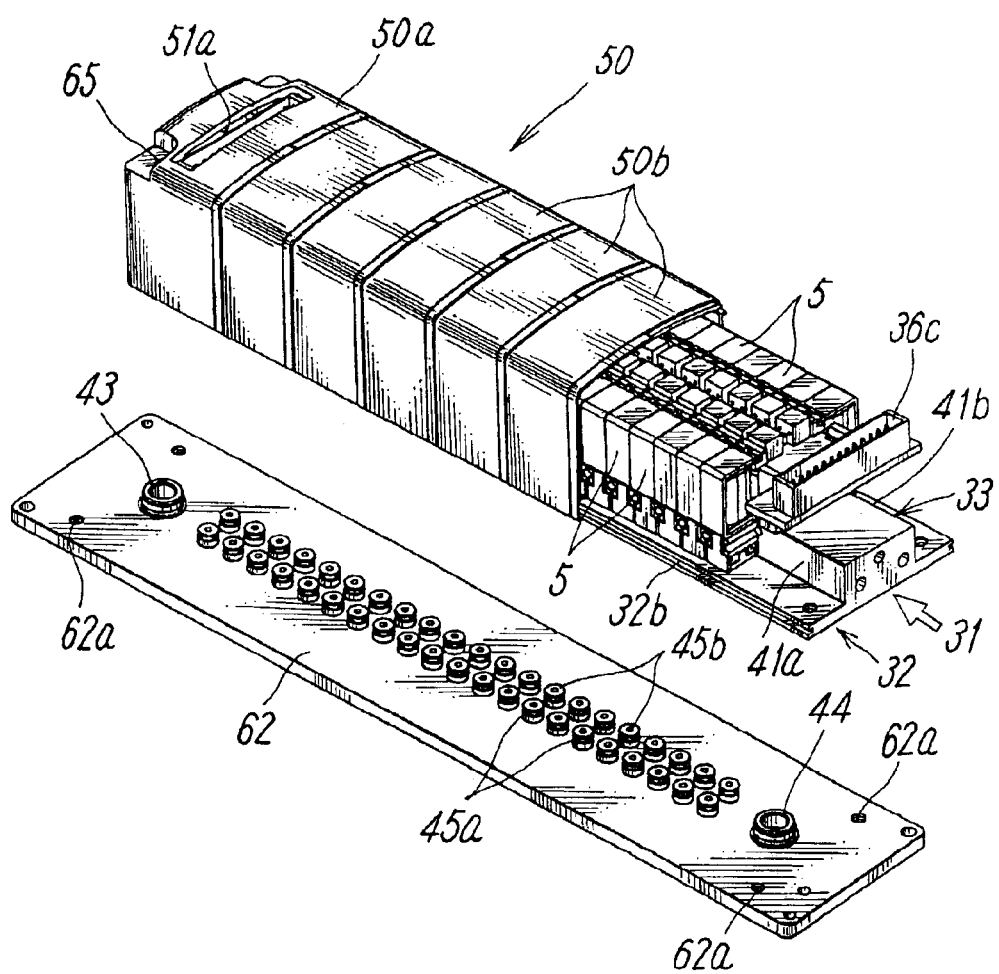
FIG. 7 is an exploded perspective view of the second embodiment with a portion of a cover removed.
Figure 8:
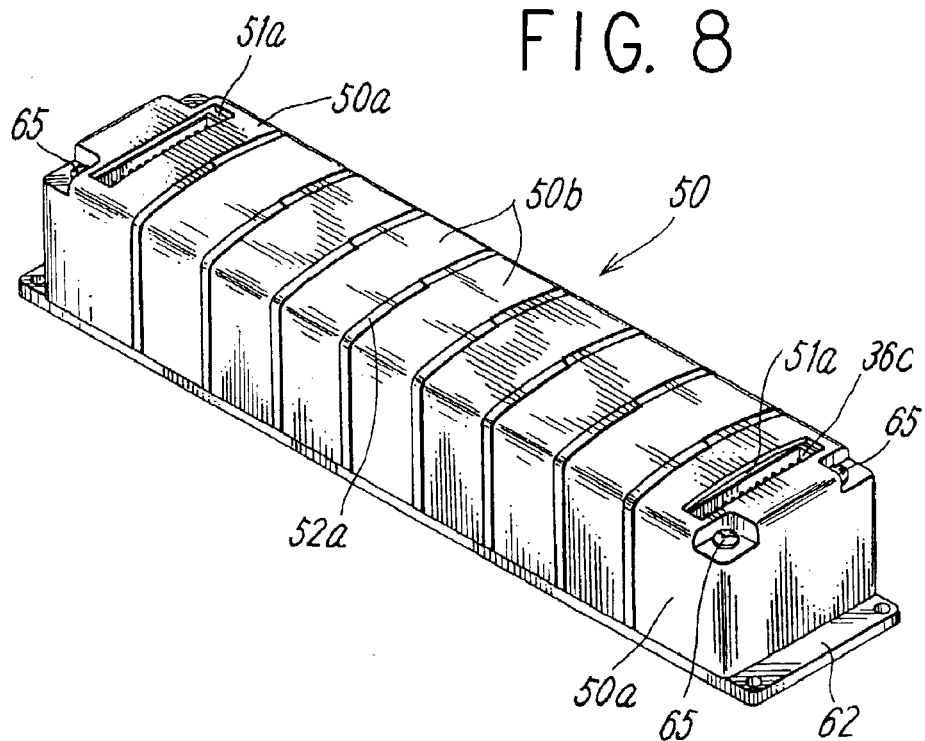
FIG. 8 is a perspective view showing an outward appearance of the second embodiment.
Figure 10:
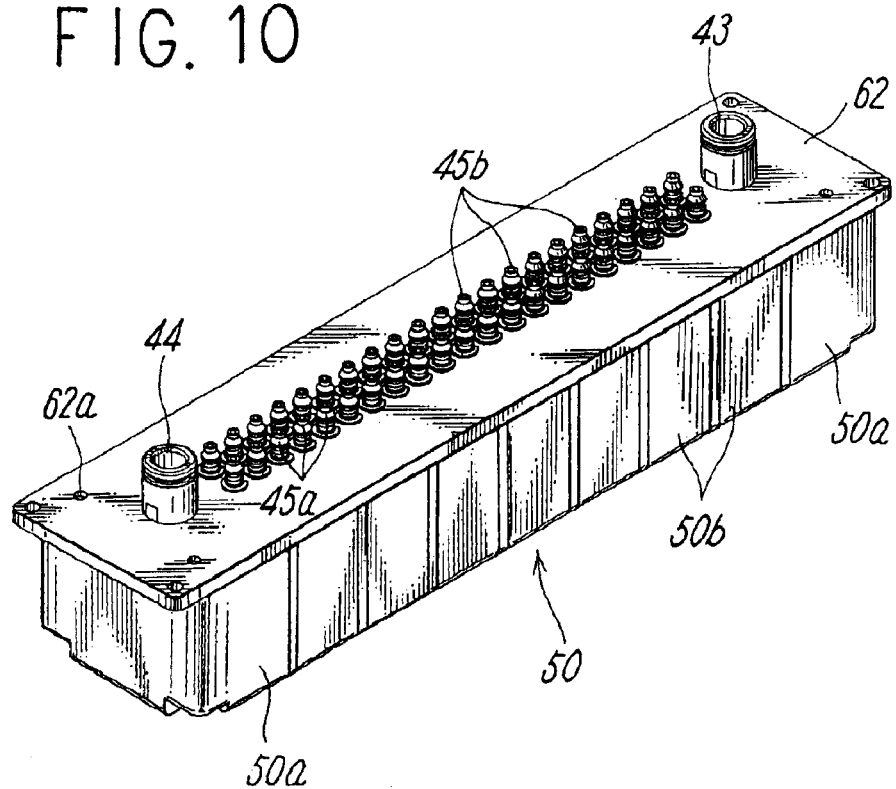
FIG. 10 is a perspective view of a lower face of the second embodiment.

The manifold valve of the second embodiment has a manifold base 31 still longer in a direction of arrangement of the solenoid valves 5 as compared with the first embodiment. In other words, in the manifold base 31, a valve mounting portion 33 is integrally formed on a base portion 32 and a substrate mounting portion 34 is fixed to the valve mounting portion 33 by screwing. The manifold base 31 is several times as long as the manifold base 31 of the first embodiment such that more solenoid valves 5 can be mounted to valve mounting faces 41a and 41b on opposite side faces of the valve mounting portion 33. FIG. 5 shows an example in which one solenoid valve 5 is mounted to each of the valve mounting faces 41a and 41b, but other solenoid valves are omitted in FIG. 5.

Because the large number of solenoid valves 5 are mounted onto the manifold base 31 as described above in the manifold valve of the second embodiment, the manifold valve is partially different in a structure from that of the first embodiment as a result of increase in the number of mounted solenoid valves 5. Therefore, in the following description, different portions of the structure will mainly be described and description of portions substantially similar to those of the first embodiment will be omitted. Portions which are not described should be understood to have similar structures and operations to those of the first embodiment.

Inside the valve mounting portion 33 in the manifold base 31, flow paths for supplying and discharging pressure fluid to and from the respective solenoid valves 5 are provided. These flow paths are open at mounting positions of the respective solenoid valves 5 and communicate with pipe joints 43 and 44 for supply and discharge and provided to a lower face of the base portion 32 and pipe joints 45a and 45b for output and corresponding to the respective solenoid valves. This is the same as the first embodiment.

On the other hand, a substrate assembly 36 supported on the substrate mounting portion 34 includes feeding connectors 36b of the number corresponding to the respective solenoid valves 5 and two outside connecting connectors 36c, 36c on a substrate 36a. Half of the feeding connectors 36b are connected to the one outside connecting connector 36c disposed on one end side of the substrate 36a and the other half are connected to the other outside connecting connector 36c provided to the other end side of the substrate 36a. This is because the number of solenoid valves 5 is large. However, if the one outside connecting connector is enough, the light-emitting devices may be provided on the other end side of the substrate 36a similarly to the first embodiment if necessary.

The manifold base 31 is provided with a dustproof cover 50 with which the whole solenoid valves 5 and substrate assembly 36 are covered. The cover 50 is formed by successively joining a plurality of cover pieces 50a and 50b having arch-shaped sections. By forming the cover 50 of the plurality of cover pieces, it is possible to easily adapt to manifold valves with different numbers of mounted solenoid valves, i.e., manifold valves with manifold bases 31 having different lengths.

A cover piece 50a out of the two kinds of over pieces 50a and 50b is provided to each of opposite end portions of the manifold base 31 and has a window hole 51a through which the outside connecting connector 36c is exposed and a mounting hole 51b. The other cover piece 50b is for covering an intermediate portion of the manifold base 31 and has such a length that a plurality of solenoid valves 5 (here, three solenoid valves) can be covered with the cover piece 50b.

Adjacent ones of the cover pieces 50a and 50b are joined to each other by fitting a projecting wall portion and a recessed step portion provided to junction portions of end portions of the cover pieces with each other. In other words, in the junction portion of each of the cover pieces 50a and 50b, the projecting wall portion 52a extending on an outer peripheral face side of the cover piece along an arch is provided to a left half portion of the arch and the projecting wall portion 52c extending on an inner peripheral face side of the cover piece along the arch is provided to a right half portion of the arch. Therefore, the recessed step portion 52b is formed on the inner peripheral face side of the projecting wall portion 52a and the recessed step portion 52d is formed on the outer peripheral face side of the projecting wall portion 52c. With the recessed step portions 52b and 52d of the one cover piece, the projecting wall portions 52c and 52a of the other cover piece are fitted to thereby connect the adjacent cover pieces to each other.

Furthermore, in the junction portion of each the cover piece, one or more projecting elements 52e, 52e are provided on the half portion side of the arch and small holes 52f, 52f of the number corresponding to the number of the projecting elements are provided on the other half portion of the arch. In joining the cover pieces to each other, the projecting elements 52e are fitted in the small holes 52f.

Projecting streaks 52g extending in an axial direction of the cover piece are formed on inner sides of side walls of the respective cover pieces 50a and 50b. By fitting the projecting streaks 52g in recessed grooves 32b formed in side ends of the base portion 32 of the manifold base 31, the respective cover pieces 50a and 50b are locked to the manifold base 31. Moreover, the cover pieces 50a on the opposite ends are fixed to a junction plate 62 by screwing mounting screws 65 into screw holes 62a in the junction plate 62 through the mounting holes 51b formed in corner portions of the cover pieces 50a.

The whole or a part of the cover pieces 50a and 50b may be made of colorless or colored transparent material or translucent material with low transparency.

Although the plurality of outside piping pipe joints 43, 44, 45a, and 45b are mounted to the base portion 32 in the manifold base 31 by mounting the junction plate 62 retaining these pipe joints to the base portion 32 similarly to the first embodiment, it is also possible to individually and directly mount these pipe joints. A structure for mounting the outside piping pipe joints to the junction plate 62 is similar to that of the first embodiment.

According to the above-described manifold valve of the invention, further intensive mounting of the large number of solenoid valves to the manifold base can be achieved to thereby obtain the manifold valve which is fully miniaturized as a manifold valve and in which pipe installation of each the solenoid valve is easy and a possibility of improper pipe installation is reduced remarkably. As the large numbers of solenoid valves are intensively mounted to the manifold base, a dustproof or waterproof small cover can easily be provided.

What is claimed is:

1. A manifold valve comprising:
  a manifold base including a base portion mounted at a lower face thereof with a plurality of pipe joints, a valve mounting portion provided on the base portion and having on opposite side faces of the valve mounting portion two valve mounting faces on which a plurality of solenoid valves are mounted, a substrate mounting portion which is provided on the valve mounting portion and on which a substrate assembly is placed, a plurality of fluid holes open at respective valve mounting positions of the valve mounting faces, and fluid flow paths for connecting the fluid holes to the pipe joints;
  the substrate assembly formed by placing feeding connectors of the number corresponding to the number of the solenoid valves and one or more outside connecting connectors communicating with the feeding connectors on a substrate and placed on the substrate mounting portion;
  the plurality of solenoid valves each of which has a feeding terminal connected to the feeding connector of the substrate assembly and a plurality of ports communicating with the respective fluid holes on the valve mounting faces and which are arranged and mounted respectively on the two valve mounting faces on the valve mounting portion; and
  a cover with which the solenoid valves and the substrate assembly are covered.

2. A manifold valve according to claim 1, wherein the valve mounting portion has a narrower lateral width than the base portion and extends through a central portion of the base portion in a longitudinal direction, the two valve mounting faces are symmetric with each other, the respective solenoid valves are mounted to opposed positions of the opposite valve mounting faces with axes of the solenoid valves in vertical directions, and the substrate mounting portions of a pair are provided to positions on the valve mounting portion on outer sides of the valve mounting faces to support opposite end portions of the substrate of the substrate assembly.

3. A manifold valve according to claim 1, wherein the outside connecting connector is provided at such a position on the substrate in the substrate assembly as to be supported by the substrate mounting portion from below and the cover is provided with a window hole through which the outside connecting connector is exposed.

4. A manifold valve according to claim 2, wherein the outside connecting connector is provided at such a position on the substrate in the substrate assembly as to be supported by the substrate mounting portion from below and the cover is provided with a window hole through which the outside connecting connector is exposed.

5. A manifold valve according to claim 1, wherein the plurality of pipe joints are retained by one joint plate and are mounted to the lower face of the base portion by joining the joint plate to the lower face of the base portion.

6. A manifold valve according to claim 2, wherein the plurality of pipe joints are retained by one joint plate and are mounted to the lower face of the base portion by joining the joint plate to the lower face of the base portion.

7. A manifold valve according to claim 3, wherein the plurality of pipe joints are retained by one joint plate and are mounted to the lower face of the base portion by joining the joint plate to the lower face of the base portion.

8. A manifold valve according to claim 4, wherein the plurality of pipe joints are retained by one joint plate and are mounted to the lower face of the base portion by joining the joint plate to the lower face of the base portion.

9. A manifold valve according to claim 1, wherein the cover is divided into a plurality of cover pieces and is formed by successively joining these cover pieces.

10. A manifold valve according to claim 2, wherein the cover is divided into a plurality of cover pieces and is formed by successively joining these cover pieces.

11. A manifold valve according to claim 1, wherein the cover is translucent.

12. A manifold valve according to claim 2, wherein the cover is translucent.

* * * * *